United States Patent [19]
Alam et al.

[11] Patent Number: 6,104,500
[45] Date of Patent: Aug. 15, 2000

[54] NETWORKED FAX ROUTING VIA EMAIL

[75] Inventors: Hassan Alam, San Jose, Calif.; Horace Dediu, Tewksbury; Scot Tupaj, Cambridge, both of Mass.

[73] Assignee: BCL, Computer Inc., Santa Clara, Calif.

[21] Appl. No.: 09/069,729

[22] Filed: Apr. 29, 1998

[51] Int. Cl.[7] .................................................. H04N 1/00
[52] U.S. Cl. ...................... 358/1.15; 358/402; 358/407; 382/101; 382/229; 382/317
[58] Field of Search .................... 358/1.15, 400, 358/401, 402, 403, 407, 434, 440, 442, 493, 448, 468; 382/100, 101, 115, 116, 181, 209, 229, 317, 228, 291, 292; 379/100.07, 100.08, 100.09

[56] References Cited

U.S. PATENT DOCUMENTS

| | | | |
|---|---|---|---|
| 4,893,333 | 1/1990 | Baran et al. | 379/100.11 |
| 5,115,326 | 5/1992 | Burgess et al. | 358/440 |
| 5,175,684 | 12/1992 | Chong | 704/3 |
| 5,265,153 | 11/1993 | Ozawa | 379/100.04 |
| 5,287,199 | 2/1994 | Zoccolillo | 358/402 |
| 5,362,948 | 11/1994 | Morimoto | 235/376 |
| 5,404,231 | 4/1995 | Bloomfield | 358/400 |
| 5,461,488 | 10/1995 | Witek | 358/402 |
| 5,737,437 | 4/1998 | Nakao et al. | 382/101 |
| 5,805,710 | 9/1998 | Higgins et al. | 382/101 |
| 5,926,565 | 7/1999 | Froessl | 382/181 |

FOREIGN PATENT DOCUMENTS

WO 96/41463  12/1996  WIPO ............. H04N 1/00

*Primary Examiner*—Edward L. Coles
*Assistant Examiner*—Joseph R. Pokrzywa
*Attorney, Agent, or Firm*—Donald E. Schreiber

[57] ABSTRACT

A processor-based fax routing method receives digital data representing a facsimile document. Without performing optical character recognition ("OCR"), the method identifies in the image data a keyword block of text, and an addressee-name block of text that is located near the keyword block of text. The fax routing method then performs OCR on the image data extracting therefrom texts for the keyword, the name of the addressee, and other text present in the facsimile. Using probabilities computed between the text of the name of the addressee and names in a list of possible addressees, and between the keyword and keywords in a list of keywords, the fax routing method determines an addressee for the document. The fax routing method then converts all text into email addressed to the fax's addressee, and stores the email onto an email server from which it may be retrieved.

9 Claims, 7 Drawing Sheets

FAX TRANSMISSION

XYZ CORPORATION
123 Main St.
Anywhere, CN 12345-6789
(111) 123-4567
Fax: (111) 765-4321

| | | | |
|---|---|---|---|
| To: | Mary Jones | Date: | August 23, 1997 |
| Fax #: | (999) 987-6543 | Pages: | 1, including this cover sheet. |
| From: | John Smith | | |
| Subject: | Latest News | | |

COMMENTS:

With your trial membership you can purchase air, car, or other travel arrangements through Travel's members-only toll-free number and get 5% cash back. Should you decide to extend your travel privileges beyond the trial, do nothing. The $49 annual fee will be billed automatically to your Mastercard or Visa card.

Once you initial and return the enclosed Confirmation Form, you'll receive all of your Travel membership materials, including a hotel directory and your personal card which you May use immediately and as often as you wish.

Because of Travel's enormous buying power you'll always get the Low Price Guarantee on airline, car, and hotel reservations. Plus, 5% cash back on travel you book through Travel. Your Travel HalfPrice HotelCard purchases can also earn you 5% Cash Bonuses when you use your Bank card to pay for your stay.

It is our pleasure to make this opportunity available to select customers like you. Take the next three months to review the Travel membership materials and use any of your free travel privileges and the Travel HalfPrice HotelCard as often as you wish.

FIG. 4

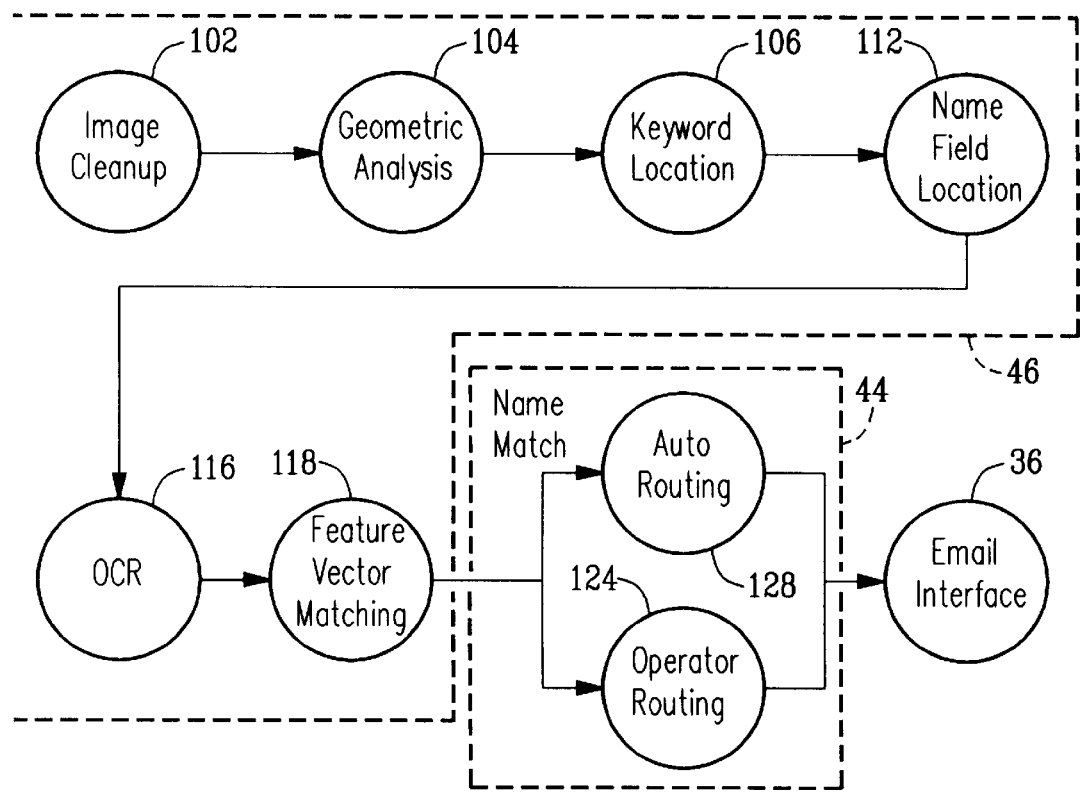
FIG. 5
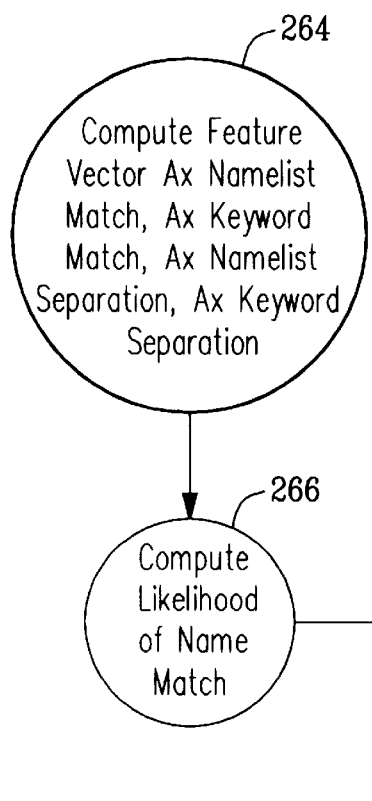
FIG. 13a
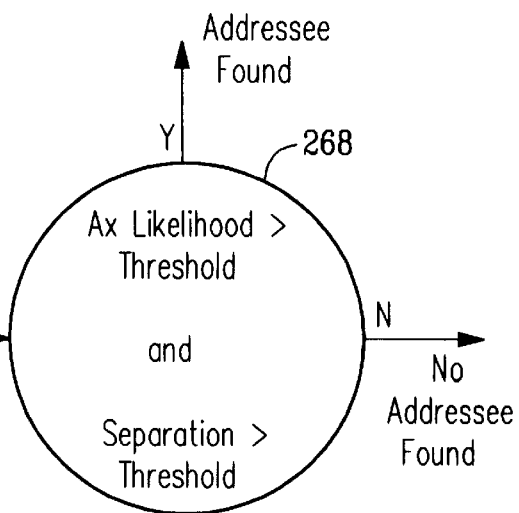

FIG. 9

NETWORKED FAX ROUTING VIA EMAIL

GOVERNMENT RIGHTS IN PATENT

The U.S. Government has a paid-up license in this invention, and the right in limited circumstances to require the patent owner to license others on reasonable terms as provided for by terms of U.S. Army Aviation and Missile Command Contract nos. DAAH01-98-P-R001 and DAAH01-98-C-R013.

BACKGROUND OF THE INVENTION

1. Field of the Invention

The present invention relates generally to the technical field of data transmission and, more particularly, to facilitating an addressee's prompt retrieval of faxes from any location anywhere in the world.

2. Description of the Prior Art

There exist two types of on-line collaboration—synchronous and asynchronous. In synchronous collaboration, people exchange information in "real-time" over high speed communication networks. Synchronous collaboration holds the promise of sharing documents, databases, and multi-media information. However this requires significant infrastructure in the form of computer equipment and permanent connection to high speed networks. While the amount of data exchanged during synchronous collaboration may be large, particularly for multi-media transfer, the amount of information maybe limited to words or gestures. Furthermore, a lack of communication standards, computer systems and document formats have delayed widespread implementation of the promised Internet based synchronous collaboration.

In contrast, asynchronous collaboration is more useful when either party does not have access to high speed permanent connections. If large amounts of information are to be exchanged over temporary low speed lines (56 KB), then asynchronous communication is more useful because the data can be exchanged without both parties being connected at the same time. Asynchronous collaboration is also more useful when a large amount of information must be analyzed by either party.

Use of fax communication continues to increase despite parallel growth in electronic mail (email). Despite the explosion in Internet communication, fax communication continues to increase. According to a 1996 Pitney Bowes/Gallup poll, fax is still the preferred method of business communication among both Fortune 500 and mid-sized business users. Davidson Consulting, which estimates that 336 billion pages will be faxed worldwide in 1996, surveyed fax machine end users and dealers and found that fax toner usage on existing machines rose at a 12% annual rate from 1995 to 1996. IDC/Link Resources reports that the computer-based fax market will sustain a 28% compound annual growth rate from 1995 through 1999.

Fax communication continues to grow because it is a universal means of rapid worldwide communication. Any two people with fax machines that are able to communicate telephonically can exchange documents by simply putting a piece of paper in one machine and receiving it as a printed document at the other machine. Availability of direct satellite telecommunications, such as the Iridium network, removes any technological barrier to sending and/or receiving faxes anywhere in the world. Advantages of fax communication are that it is cheap, simple, universal, and format independent. Furthermore, fax communication has an advantage over traditional email in that it conveys an author's graphics and layout in their original format.

A significant disadvantage of present fax communication is that, unless the sender has an addressee's personal fax number, the fax has to be forwarded to the addressee. Forwarding faxes generally requires visual inspection and manual routing to the addressee. Moreover, if a fax addressee's location and telephone number changes frequently, it becomes more likely that they may not receive faxes promptly. In comparison with email, down-loading a fax's image is time consuming over present telephone lines. A fax server, particularly a networked fax server, partially solves the fax routing problem. U.S. Pat. No. 5,461,488 entitled "Computerized Facsimile (FAX) system and Method of Operation" discloses a system that receives a fax, stores the fax in a computer file, performs optical character recognition (OCR) on the stored data to determine the fax's destination, and then uses an email program to route the fax to its destination(s). However, according to an article that appeared in Byte magazine, "Network Fax servers' greatest weakness is in routing received faxes."

Presently, various different fax server systems exist that automatically route a received fax. One approach to automatic fax routing assigns each fax addressee a unique telephone extension number so a fax can be routed beyond the fax server to the addressee's workstation. Senders must know the addressee's entire fax telephone number including extension, and enter the extension number at the proper moment using a TouchTone® telephone. Sometimes, a voice prompt indicates when to enter the extension number. There are several difficulties with this method. First, the sender must have access to a TouchTone telephone which may not be available to, or widely used by, potential fax senders. Next, the sender must know and dial the addressee's extension number. Moreover, the method doesn't work for automated fax transmissions (delayed sends, auto re-dials—the kind of faxes sent automatically by fax servers). Consequently, fax servers that use an extension number for routing faxes have proven less than satisfactory.

An alternative method for transmitting a code number designating a particular fax addressee employs a modified handshaking protocol between the transmitting fax machine and the fax server. The modified handshaking protocol includes a sub-address which carries the addressee's code number from the transmitting fax machine to the fax server. Equipping fax machines for the modified handshaking protocol requires that they conform with an ITU-T T.33 telephone standard. Presently, fewer than 1% of installed fax machines support any form of sub-addressing, putting in question its applicability in anything other than highly controlled environments.

Yet another approach employed for fax routing assigns each addressee a unique, direct-inward-dialing (DID) telephone number. DID employs the same telephone technology that allows people in large office buildings to have a "direct line." With DID, each workstation has a direct fax phone number, but calls to all the different users' fax phone numbers arrive over a single phone line (or common bank of multiple lines). Receive-only telephone lines for each and every DID telephone number connect either to a single fax server equipped with DID compatible fax boards, to a DID gateway, or to a conversion module. All faxes for assigned telephone numbers arrive over the same DID phone line(s), and the DID system in the fax server matches the seven-digit number to the proper mailbox. Remote senders need only know an addressee's ordinary fax telephone number. The phone company assigns DID numbers (often in packs of 10, 50 or 100), and each user is assigned a fax mailbox corresponding to that user's unique seven-digit telephone number. U.S. Pat. No. 5,287,199 entitled "Facsimile Message Processing and Routing System" discloses such a system in which the unique DID telephone number is also a key for retrieving from a database an information processing record that controls fax processing.

With multi-line fax servers, faxes received on separate telephone lines, each having its own phone number, can be routed automatically to a particular department, and then be either automatically printed, or manually or automatically forwarded from there. For example, if a fax server has four lines, each telephone line can receive faxes for one of four different departments, while all four telephone lines can still be used in a shared mode to handle all outbound faxes. Disadvantages of such systems include incurring monthly charges from the phone company for each DID line, plus potentially substantial installation fees and delays. Sometimes installing DID is complicated or impossible.

Another way to route incoming fax messages places an addressee identifier into the transmit terminal identifier (TTI) message that appears in the top margin of each received fax page. The TTI message identifies the sender, usually with a fax telephone phone number and/or company name. Fax servers can be programmed to recognize a TTI and route all faxes with that TTI to a particular workstation and only that workstation. This makes TTI fax routing suitable for niche applications, e.g., Purchase Orders routed by geographic region to individual addressees.

Currently a number of automatic fax routing systems can route document images based on content. In this method, the document's content is extracted from a pre-defined location on the document's image, and then used in forwarding the document to a person or a location. In theory, this approach can be used for routing faxes automatically. U.S. Pat. No. 5,175,684 entitled "Automatic Text Translation and Routing System" discloses such a system which requires use of a fax cover page having predefined fields. In practice, two problems occur. First, pre-definition of the document proves to restrictive for faxes. There is no fixed fax cover sheet format, and even with a reasonably large set of pre-defined fax formats, errors occur in exact field location and simple translation and rotation of the document image. Secondly, these systems require an exact match with data recognized in the field to route the fax. Current optical character recognition (OCR) has about 2% error per character for good quality documents. On a 15 character name field, this error compounds to a 26.1% error rate of one or more characters. Combination of low fax quality and inherent OCR error make this approach unusable for reliable fax routing.

OCR and/or intelligent character recognition (ICR) may be used for automated inbound fax routing, with some notable caveats. With some OCR-based fax server systems, senders must type the receiver's name in coded format, e.g., <<Peter Davidson>>, and then a properly equipped fax server tries to recognize the code to route the fax. With ICR, handprint can be used for routing, and the fax server can search the entire cover sheet for clues (addressee name, department) used in routing the faxes. However, local area network (LAN) administrators using such systems must maintain a database having all possible fax addressees' names, including nicknames and even common misspellings. Nevertheless, precision of fax routing is quite poor.

The absence of a satisfactorily precise, fully automatic, and backward compatible fax routing technology is a direct consequence of the nature of fax communication. Faxes are analogous to standard business correspondence. It is because of this analogy that fax communication has been so successful in penetrating business communications infrastructures. The ancient and proven business process of written communication via paper was quickly adapted for transmission over telephone lines because the switching costs were low and payoff was immediate. The use of fax machines left the correspondence process essentially unchanged. The envelope, which in paper transmission was used to ensure privacy and routing, has been replaced by the cover page. However, unlike envelopes and their somewhat standard addressing methods, fax cover pages were never standardized. Furthermore, due to the cost of transmission, cover pages are used for message transmission as well as addressing, further frustrating any attempt at standardization.

In contrast to conventional fax communication, email delivers messages to a central mail box from which the addressee can easily retrieve them. Email has three advantages over fax for receiving communications. Received email is editable. Inherently, email is routed automatically to the correct user. Email is available immediately upon logging into the correct email server. However, email looses graphical and format information in the original document. While email can be easily converted to fax, presently there exists no easy way to convert a fax to email.

Converting faxes to email requires extracting fields from faxes which is part of ongoing document analysis research. Document analyses comprises various aspects of understanding contents of paper documents. A significant part of document analysis research investigates decomposing business correspondence, of which fax documents are a subclass, seeking methods for understanding contents of paper documents. Various reports, such as Taylor, et al., *Document Classification and Functional Decomposition,* 1995 Symposium on Document Image Understanding Technology, p. 56 and Dengel, et al., *OfficeMAID—A System for Office Mail Analysis, Interpretation and Delivery,* International Association for Pattern Recognition on Document Analyses Systems, 1994, pp. 253–276, describe research into decomposing business letters. Dengel, et al.'s method uses a tree search in attempting to match a geometric layout employed in German business letters with templates. If a letter does not match any template, the template which most closely matches the letter is selected, or the user is given an opportunity to add another template to the list. Dengel, et al. describe experiments attempting to convert business letters into email.

Taylor, et al. in *Functional Decomposition of Business Letters,* Fourth Annual Symposium on Document Analysis and Information Retrieval, p. 435, describe a more comprehensive method for analyzing business letters. The method uses text cues, format cues, and location cues to identify components of the letters. The method employs a four pass rule based system to successively identify the components. If-then-else like rules identify components in the letters, and then a grammar combines the components into a larger structure. Taylor, et al. report that using fuzzy rules helps in ambiguous situations.

BRIEF SUMMARY OF THE INVENTION

The present invention provides a system for converting faxes to email, and for routing the email containing the converted fax for subsequent retrieval by the fax's addressee.

Accordingly, an object of the present invention is to enhance fax communication by permitting asynchronous collaboration use email so both faxes and email can be treated as a single medium.

Another object of the present invention is to augment fax communications with the communication capabilities of email.

Another object of the present invention is to provide rapid, email access to received faxes.

Another object of the present invention is to provide a processor-based method for spotting names in faxes.

Another object of the present invention is to provide a processor-based method for differentiating between addressee and sender, or other names, in faxes.

Another object of the present invention is to provide a processor-based method for handling low quality faxes.

Another object of the present invention is to provide a high-accuracy, processor-based method for routing faxes automatically.

Another object of the present invention is to provide a single medium that combines fax based asynchronous collaboration with electronic mail thereby allowing rapid access to incoming fax without physically visiting the fax server.

Another object of the present invention is to provide a system that allows an addressee to review large volumes of incoming faxes using the interface provided by a conventional electronic mail system.

Briefly, the present invention is a system that automatically converts incoming fax to electronic mail for transmitting the message along with all its components to the intended addressee. The system allows fax addressees to receive faxed messages anywhere in the world sent to a single number from which the addressee can then retrieve the fax using email. Furthermore, by decomposing the fax into its fields (sender, body, addressees to read the fax as an email message from any lap-top computer in the world. If the complete document is required, then the image of the fax can be retrieved for selected pages.

A processor-based fax routing method in accordance with the present invention receives via electronic fax communication image data representing a document into a digital computer. The image data received by the digital computer includes a name of an addressee for the fax communication. The processor-based fax routing method then identifies in the image data of the fax communication a keyword block of text that is likely to be located near the name of the addressee. The processor-based fax routing method then identifies in the image data of the fax communication an addressee-name block of text, located near the keyword block of text, that likely contains the name of the addressee. The processor-based fax routing method then performs optical character recognition ("OCR") on the image data of the fax communication to extract therefrom texts including texts for the keyword, the name of the addressee, and other text present in the image data.

The processor-based fax routing method then determines probabilities that the text of the name of the addressee extracted by OCR from the image data is that of names in a list of possible addressees, and probabilities that the keyword extracted by OCR from the image data is that of keywords in a list of keywords. Using the probabilities that the text of the name of the possible addressee is that of names in a list of possible addressees and the probabilities that the keyword is that of keywords in a list of keywords, the processor-based fax routing method evaluates a likelihood that an addressee for the document has been identified. The processor-based fax routing method then determines an addressee for the document by comparing a best likelihood that an addressee for the document has been identified with a pre-established likelihood threshold, and by comparing a separation between the best likelihood that an addressee for the document has been identified and a second best likelihood that an addressee for the document has been identified with a pre-established separation threshold.

Having identified an addressee for the document, the processor-based fax routing method converts all text extracted by performing OCR on the image data into email addressed to the addressee identified for the fax communication, and stores the email thus obtained onto an email server from which the identified addressee may retrieve the extracted text.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 4 is an image of a fax such as that which may be received and processed by the fax server system depicted in FIG. 1;

FIG. 5 is a flow diagram depicting the fax analysis and fax router engine depicted in FIG. 3;

FIG. 9 is an image of a fax routing sheet;

FIGS. 13a and 13b are flow diagrams depicting in greater detail different portions of feature vector matching that is illustrated in FIG. 5.

DETAILED DESCRIPTION

Figure 1:
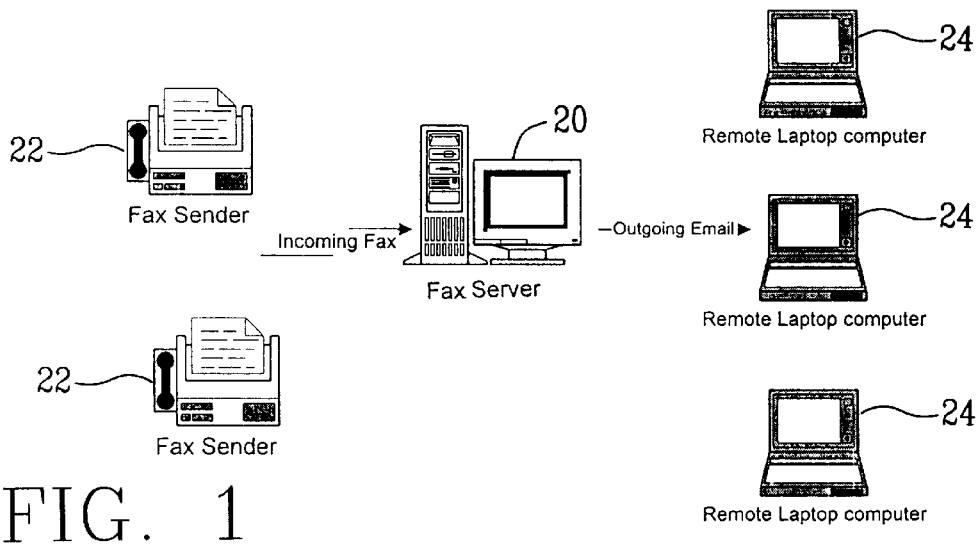
FIG. 1 is a block diagram illustrating a fax server system that receives and processes incoming faxes, and then stores them within the fax server so the faxes can be retrieved as email from remote computers such as laptop computers.

FIG. 1 depicts a fax server 20 that receives faxes from fax senders 22. The fax senders 22 may send faxes to the fax server 20 by any method of electronic communication, but preferably using the public telephone system. As is well known in the art, the fax server 20 includes a digital computer which executes a computer program for processing the faxes. As is also well known in the art, the fax server 20 includes a random access memory (RAM) for temporarily storing data and computer programs that are permanently, or semi-permanently, stored on one or more hard disk drives, or on a redundant array of inexpensive disks (RAID), that is included in the fax server 20. The computer programs executed by the digital computer included in the fax server 20 also provide an email service by which remote computers 24, that in principle may be located anywhere in the world, can retrieve routed faxes from the fax server 20 as email. The hardware of the fax server 20, fax senders 22 and the remote computers 24, and for communicating between the fax senders 22 and the remote computers 24 with the fax server 20 is conventional, is not depicted in any of the other Figures, and provides an environment in which the present invention operates.

Figure 2:
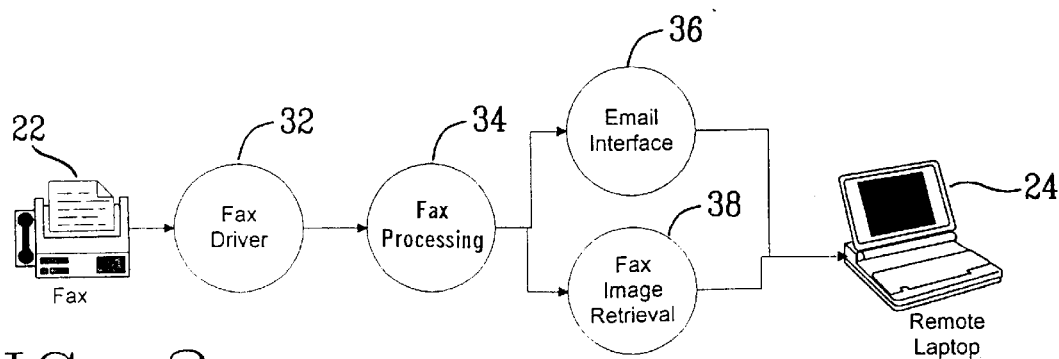
FIG. 2 is a flow diagram illustrating receipt of incoming faxes by the fax server illustrated in FIG. 1, fax processing within the fax server, and subsequent fax retrieval either as email text or as images.

FIG. 2 illustrates processing performed by computer programs executed by the digital computer included in the fax server 20. The computer programs executed within the fax server 20 include a fax driver computer program 32 that receives faxes sent by the fax senders 22. After a fax has been received, a fax processing computer subsystem 34 processes the fax to determine, among other things, the addressee, and then stores the fax within the fax server 20 both as conventional email and as a fax image. An email interface facility 36 and a fax image retrieval facility 38, executed by the fax server 20, then permit the remote computers 24 to retrieve the stored fax either as email or as a fax image.

Figure 3:
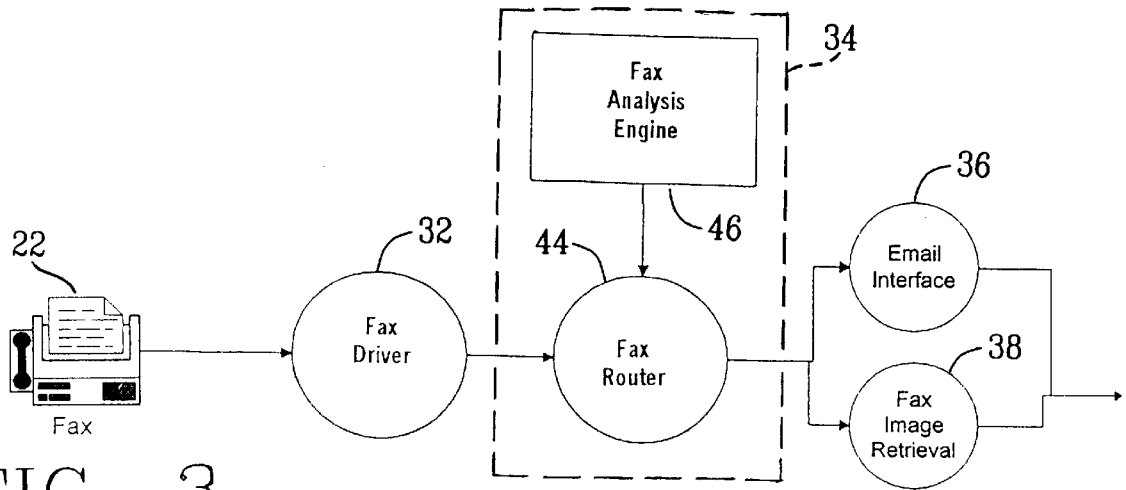
FIG. 3 is a flow diagram illustrating in greater detail fax router and fax analysis engine processing performed within the fax processing depicted in FIG. 2.

FIG. 3 depicts in greater detail the fax processing computer subsystem 34 depicted in FIG. 2. The fax processing computer subsystem 34 includes a fax-router computer program 44 that receives image-data representing a fax from the fax driver computer program 32. The fax-router computer program 44 shares data representing a fax with a fax-analysis-engine computer program 46 that processes the data representing a fax to determine to whom the fax is addressed, and also to convert the fax data into text data suitable for transmission as email. After the fax-analysis-engine computer program 46 performs this processing, it provides both the address and the email data to the fax-router computer program 44 which then forwards both the address and the email data to the email interface facility 36, and the image-data representing the fax to the fax image retrieval facility 38.

FIG. 4 depicts an exemplary fax 52 such as that an image of which may be received and processed by the fax server 20 depicted in FIG. 1. A sender identifier header 54 appears near the top of the fax 52. Immediately beneath the sender identifier header 54 is an addressing block 56 that includes names of both of the addressee and of the sender of the fax 52. Beneath the addressing block 56 is a text area 58 which occupies the remainder of the fax 52. The techniques that locate the address in the image data of the fax 52 includes rules for image cleanup (de-skewing, shade removal) geometric analysis (line identification, block bounding box detection), and feature pattern analysis (attribute-value pair detection). A rules engine combines the result of this feature extraction process and removes blocks of the image from further analysis.

FIG. 5 is a flow diagram illustrating processing steps performed by the fax-router computer program 44 and by the fax-analysis-engine computer program 46 depicted in FIG. 3 in processing the image-data representing the fax 52. After the fax-router computer program 44 supplies the data representing the fax 52 to the fax-analysis-engine computer program 46, the fax-analysis-engine computer program 46 in processing block 102 first cleans up the image of the fax 52. As is well known to those skilled in the art, skewed images present a problem for document analysis due to an assumption that text flows across a page parallel to a horizontal axis. The method described in "Analysis of Textual Images Using the Hough Transform," S. Srihari and V. Govindaraju, *Machine Vision and Applications,* vol. 2, pp. 141–153, (1989), incorporated herein by reference, permits determining a skew angle for a pixel-format image-data representing the fax 52 Image clean-up also includes removing noise from the pixel-format image-data representing the fax 52, and de-skewing the image of the fax 52 represented by such data.

After image cleanup, the image data undergoes geometric analysis in processing block 104. Geometric analysis' primary objective is to differentiate between areas of a fax cover page that are unlikely to contain an addressee's name and areas that are likely to contain the name. Differentiating between areas of a fax cover page that are unlikely to contain the addressee's name and sections that may contain the name is accomplished in two steps. First, geometric analysis identifies blocks in the image-data that are to be avoided in searching for the addressee's name are the text area 58, such as that depicted in FIG. 4, as well as any blocks that contain a graphic image. The text area 58 is identified without actually performing OCR by computing a histogram of the pixel density. A text area 58 exhibits a comparatively high pixel density in comparison with other areas of the fax 52 such as the sender identifier header 54 and the addressing block 56. The result of identifying areas in the image data to be avoided identifies a set of blocks of image data which are more likely to contain the addressee's name.

Those blocks of the image data which are more likely to contain the addressee's name are then converted to BCL Document ("BDOC") format, an abstract representation of a document. The BDOC representation of the image data establishes a geometric, block level representation of a document such as those depicted in FIGS. 7 and 8. For locating keywords in the fax 52 processing block 104 of the fax-analysis-engine computer program 46 uses the BDOC representation of the smeared image illustrated in FIG. 8. Use of the smeared image effectively aggregates words together to obtain a higher level text object.

After blocks in the image data likely to contain a keyword have been identified in processing block 104, such areas are processed in processing block 106 to determine if, in fact, they contain certain keywords that indicate a likelihood that an addressee name field is nearby. Keywords, such as those listed below both with and without a colon (:), are identified without OCR processing.

| To: | Recipient: |
|---|---|
| Name: | Attn: |
| Dear | Mr. |
| Ms. | Dr. |
| Attention: | |

Figure 7:
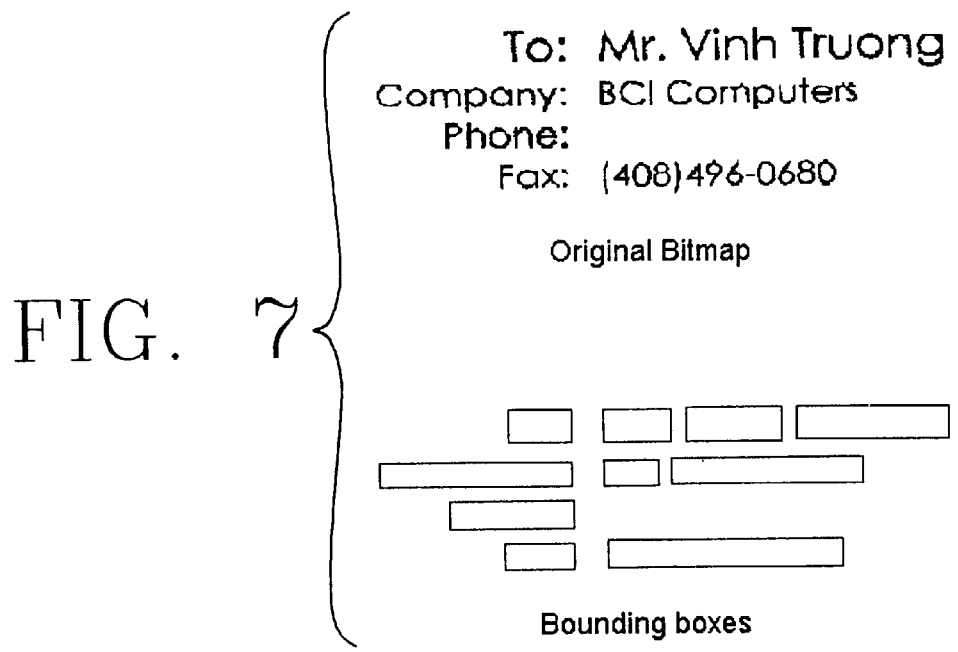
FIG. 7 is an image of an original bitmap of a fax address together with bounding boxes determined for the text of the fax address.
Figure 8:
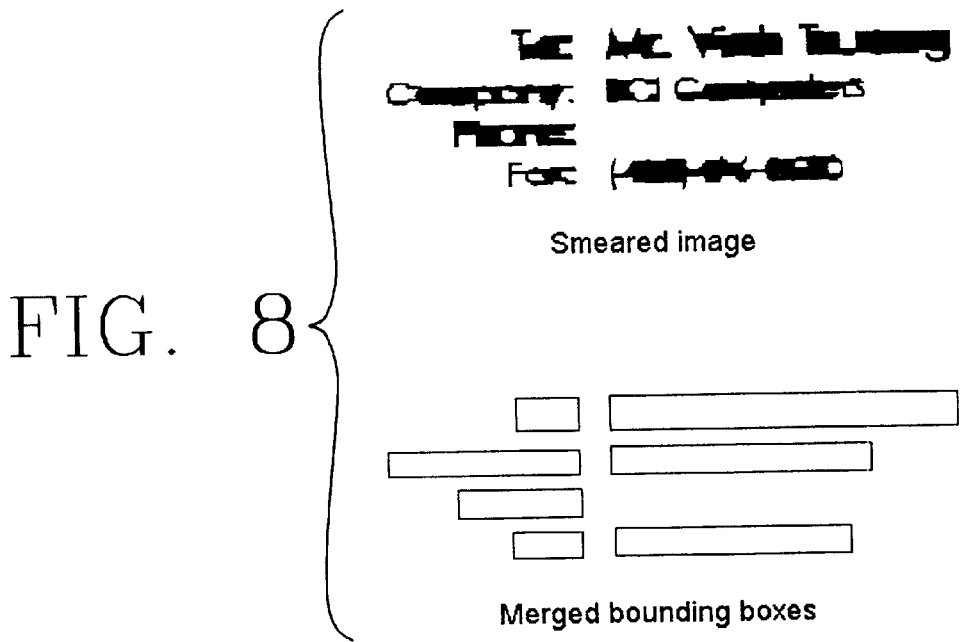
FIG. 8 is an image of a bitmap of the fax address depicted in FIG. 7 after the image has been smeared together with merged bounding boxes determined for the smeared text of the fax address.

In English, keywords such as those listed above usually occur at the left hand end of blocks such as those illustrated in FIG. 7. Furthermore, blocks in the image data that may contain a keyword generally have a significant amount of white space immediately left of such a block. After finding a possible keyword area, ascertaining if the area contains a particular keyword may be performed using either of two techniques. One way of ascertaining if an area of the image data contains a particular keyword without performing OCR is by comparing an outline of black space in each possible keyword area with black space outlines for each of the words in the keyword list. An alternative way of ascertaining if an area of the image data contains a particular keyword without performing OCR is by comparing a Fourier transform of the black space in each possible keyword area with a Fourier transform of the black space for each of the words in the keyword list. Keyword location and recognition reduces possible confusion between addressee names and sender names within address block areas on the fax 52 by permitting an inference of the sender/addressee relationship.

Figure 9:
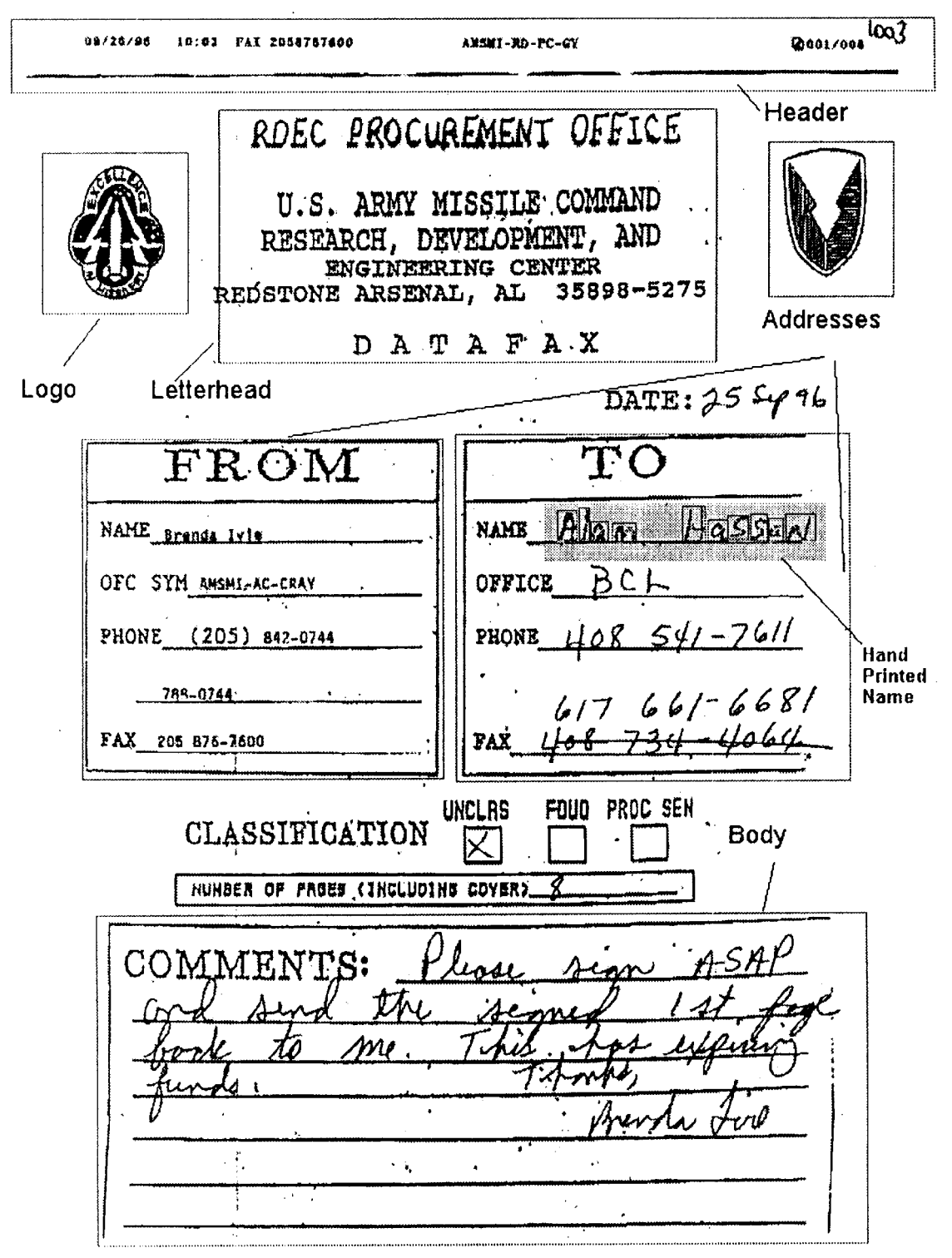

After keywords have been found in processing block 106, the fax-analysis-engine computer program 46 executes processing block 112 to locate name fields in adjacent areas of the image data based upon their nearness to and relationship with keywords. Keywords associated with the addressee's name such as "To," "Recipient," "Attn" or "Dear" point to the addressee names. Typically, addressee names are located to the right of the keyword. However due to font size differences and multiple names, addressee names may not be aligned horizontally with the keyword. Thus, in locating name fields the fax-analysis-engine computer program 46 seeks strings of text located to the right of and near the keyword. Name lists are likely to extend below the keyword but are restricted to 2 lines above the keyword. Examples of variation on name placement can be seen in FIG. 9.

After the name fields have been located in processing block 112, then in processing block 116 OCR is performed on all the printed text in the fax 52. As used herein, OCR includes optical character recognition of machine printed text, even that of low quality, printed handwriting, and cursive handwriting. After OCR has been performed on the entire fax 52, the texts thus obtained for the name fields identified in processing block 112 are processed in processing block 118 to select an addressee for the fax 52 from a list of possible addressees. The fax-router computer program 44 automatically polls the email interface facility 36 for a complete list of all possible addressees thereby keeping the fax server 20 up to date at all times. Permutations of last name, first name and middle initial are used to improve selection of the intended addressee.

Deciding among possible intended addressees for the fax 52 is not the same as unambiguously decoding the intended addressee's name from the image data. Rather, picking a particular addressee can be understood as eliminating all the names which are not that of the intended addressee, thereby maximizing precision (minimizing misrouting). A metric that measures the distance between the OCR text for the possible addressee's name and names in the list of possible addressees is used to assess degrees of similarity.

In comparing text obtained by OCR for a possible addressee's name field, the distance of the OCR text for a possible addressee's name is measured using every name in the possible addressees list (last name augmented by first name substrings) to substrings of the OCR text for the possible addressee's name. A generalized form for an addressee's name is set forth symbolically below.

<Title> <Fname> <Mname> <Lname> <suffix>

In addresses appearing on the faxes 52, the <Fname> and the <Mname> may be abbreviated to merely <F> or <M>. The list of all possible addressees therefore includes not only the generalized form for each possible addressee, but is augmented by all legal permutations of <Fname>, <F>, <Mname>, <M>, and <Lname>.

There exist a number of methods for measuring the distance between two strings. These include the Wagner-Fischer algorithm, the Manhattan Distance algorithm, the Euclidean Distance algorithm and the Geometric Distance algorithm. Each of these procedures measure a minimum cost for transforming one string into another string in accordance with the different distance measures. The fax-analysis-engine computer program 46 preferably uses a modified Manhattan Distance algorithm that weights character transformations with the probability that such a transformation will occur due to OCR induces error.

This preferred method allows comparing unequal length strings, accounting for likely OCR errors, and measuring a distance between the OCR text for the possible addressee's name and all names in the list of possible addressees. If the minimum distance of some name exceeds a pre-established threshold, then the name field most likely contains that name. The measurements of the distances thus computed between the OCR text for the possible addressee's name and all names in the list of possible addressees is further weighted by the text's proximity to and relationship with the keywords identified in processing block 106. Thus, the OCR text for a possible addressee's name will never be located above and/or to the left of a keyword such as the keyword "To."

If processing block 118 determines by the preceding process that the OCR text in a possible addressee name field adjacent to a keyword does not match any name in the list of possible addressees, or if approximately equal distances are computed between the OCR text in a possible addressee name field for at least two (2) names in the list of possible addressees, then the fax-router computer program 44 in processing block 124 presents a visual image of the fax 52 to an operator for manual routing to the addressee. Otherwise, processing block 128 to automatically routes the fax 52 to the addressee. After assigning a routing of the fax 52 to the addressee either in processing block 124 or in processing block 128, the text obtained by OCR processing in the processing block 116 is converted into email in email interface facility 36.

Geometric Analysis 104

Figure 10:
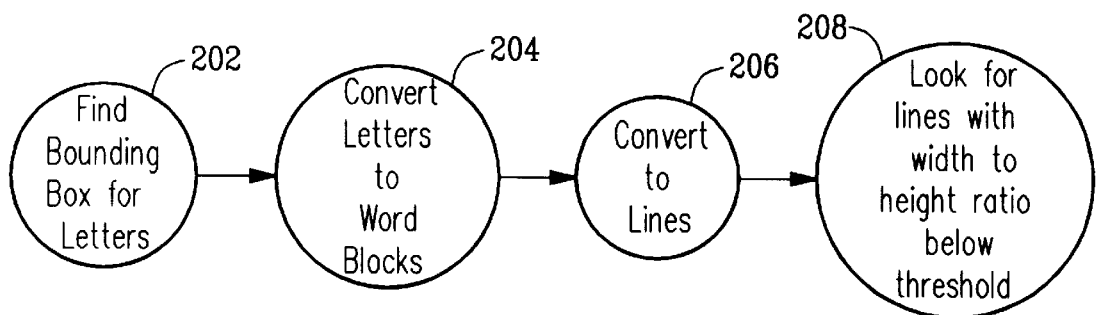
FIG. 10 is a flow diagram depicting in greater detail geometric analysis of a facsimile image that is illustrated in FIG. 5.

FIG. 10 illustrates geometric analysis of the image of the fax 52 performed by the fax-analysis-engine computer program 46 in processing block 104, after areas of a fax cover page that are unlikely to contain a keyword have been identified, by generating the BDOC representation of image data likely to identify the addressee(s). In establishing the BDOC representation, the fax-analysis-engine computer program 46 in processing block 202 first establishes bounding boxes for individual letters in those areas of a fax cover page that are likely to identify the addressee(s). In processing block 204, the fax-analysis-engine computer program 46 suitably combines together bounding boxes containing individual letters established in processing block 202 into word blocks. The word blocks are then combined into line blocks in processing block 206. Having thus established this BDOC representation for the image data, the fax-analysis-engine computer program 46 in processing block 208 looks for lines with a font dependent width-to-height ratio below a pre-established threshold. A width-to-height ratio of 50:1 is preferred for a 10 point courier type font.

Locating Keywords 106

Figure 11:
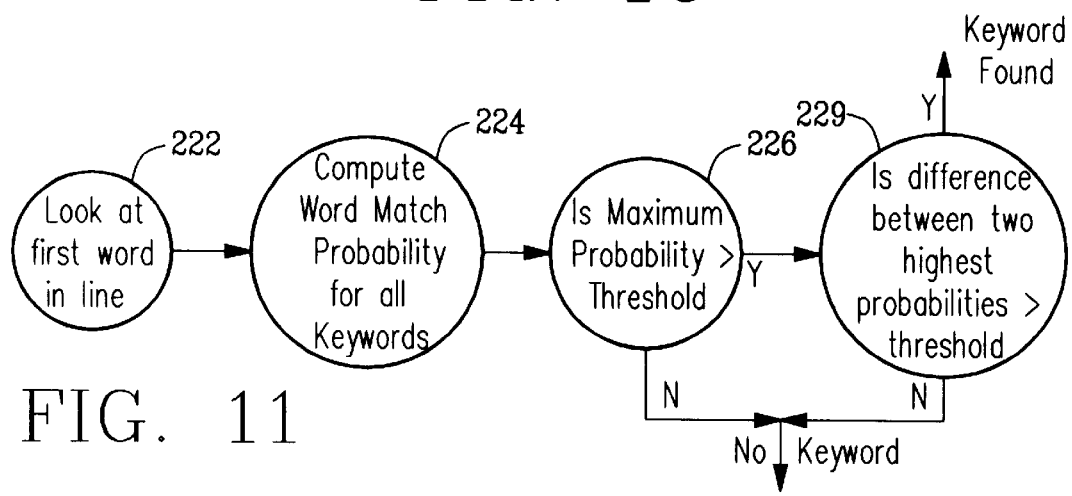
FIG. 11 is a flow diagram depicting in greater detail locating keywords in a facsimile image that is illustrated in FIG. 5.

FIG. 11 illustrates how keywords are located in a facsimile by the fax-analysis-engine computer program 46 in processing block 106 after the fax-analysis-engine computer program 46 in processing block 104 identifies blocks in the image data that are likely to identify the addressee(s). The fax-analysis-engine computer program 46, in processing block 222, begins keyword location by selecting the first word at the left in each BDOC representation having a width-to-height ratio below the pre-established threshold, and then in processing block 224 computes a word-match probability for that word with all keywords in the keyword list. As described above, ascertaining if an area of the image data contains a particular keyword is performed without OCR either by comparing an outline of black space in each possible keyword area with black space outlines for each of the words in the keyword list, or by comparing a Fourier transform of the black space in each possible keyword area with a Fourier transform of the black space for each of the words in the keyword list. If in processing block 226 the maximum word-match probability for a line of text is less than a user-adjustable pre-established minimum, then that particular line does not begin with a keyword. If in processing block 228 a separation between the best and the second-best word-match probabilities is less than a user-adjustable pre-established minimum separation, then that particular line does not begin with a keyword. If the word-match probability exceeds the user-adjustable pre-established minimum threshold, and if the difference between the two greatest word-match probabilities exceeds the user-adjustable pre-established minimum difference, then that particular line begins with a keyword.

Name Field Location 112

Figure 12:
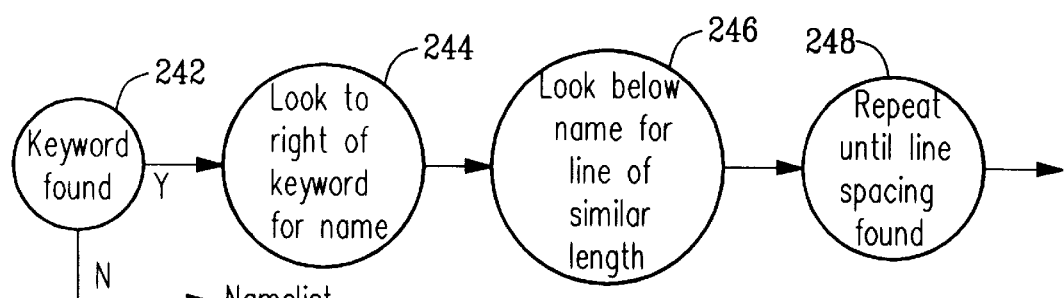
FIG. 12 is a flow diagram depicting in greater detail name field location that is illustrated in FIG. 5.

FIG. 12 illustrates location of name fields in a facsimile by the fax-analysis-engine computer program 46 in processing block 112 after the fax-analysis-engine computer program 46 in processing block 106 has attempted to locate keywords in line blocks having the prescribed length-to-width ratio. If the fax-analysis-engine computer program 46 in processing block 106 did not locate any line blocks containing keywords, then the fax-analysis-engine computer program 46 in processing block 242 causes all such line blocks to be processed for names of potential addressees for the fax 52 in feature vector matching processing block 118. If the fax-analysis-engine computer program 46 in processing block 106 located any keyword(s), then in processing block 244 the fax-analysis-engine computer program 46 looks to the right of a keyword for a possible addressee's name to be processed through processing block 118. If the fax-analysis-engine computer program 46 finds a possible addressee's name located to the right of a keyword, then the fax-analysis-engine computer program 46 in processing block 246 determines if another possible addressee's name, that is to be processed through processing block 118, also occurs in a line block having a similar length that is located immediately below the immediately preceding possible addressee's line block. If another line block having a similar length occurs, the fax-analysis-engine computer program 46 in processing block 248 continues looking for additional, similar length line blocks arranged vertically down the fax 52. When the fax-analysis-engine computer program 46 encounters either a space or a line block having a sufficiently dissimilar length, then the fax-analysis-engine computer program 46 processes all the line blocks thus identified for possible addressee's through processing block 118.

Feature Vector Matching 118

After the fax-analysis-engine computer program 46 in processing block 116 performs OCR, in the way illustrated in FIG. 13a the fax-analysis-engine computer program 46 in processing block 118 attempts to select the addressee(s) for the fax 52 from texts recognized for line blocks that possibly contain addressee names. In attempting to select the addressee(s) for the fax 52 the fax-analysis-engine computer program 46 employs an empirically determined four (4) dimensional maximum likelihood estimate function determined using conventional cluster analysis. In evaluating the maximum likelihood estimate function, the fax-analysis-engine computer program 46 first computes probabilities for:

1. matching between:
    a. names of the possible addressee(s); and
    b. keywords, and
2. separation between:
    a. the best name match and the second best name match; and
    b. the best keyword match and the second best keyword match.

Accordingly, in processing block 264 the fax-analysis-engine computer program 46 computes a word-match probability between names of possible addressees included in the complete namelist of all addressees, which the fax-router computer program 44 obtains by automatically polling the email interface facility 36, and the text for the line block of a possible addressee name obtained by OCR in processing block 116. As described previously, the namelist of all possible addressees includes not only the generalized form for each possible addressee, but is augmented by all legal permutations of <Fname>, <F>, <Mname>, <M>, and <Lname>. Similarly, in processing block 264 the fax-analysis-engine computer program 46 computes a word-match probability between keywords included in the keyword list set forth above and the text obtained by OCR in processing block 116 for keyword blocks that were located in processing block 106.

Figure 13B:
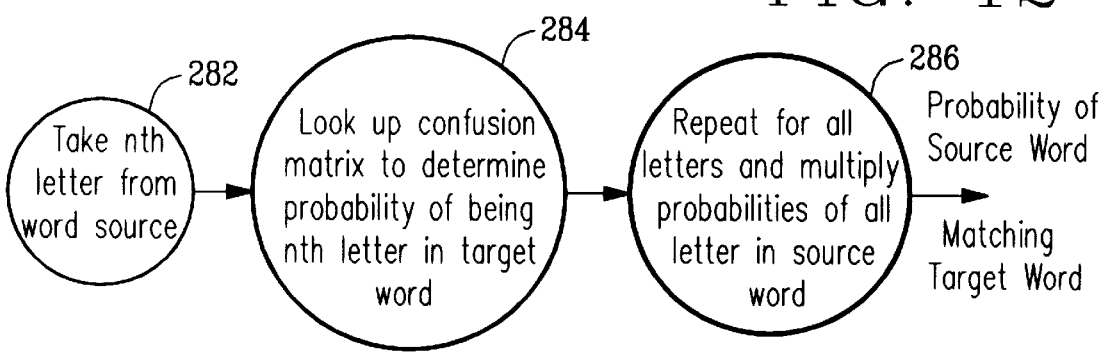

FIG. 13b illustrates how word-match probabilities, that are used in feature vector matching in FIG. 13a, are determined. To determine a word-match probability, the fax-analysis-engine computer program 46 in processing block 282 successively selects letters from the word, i.e. either a name in the namelist of possible addressees or a keyword in the keyword list, beginning with the first letter. Then in processing block 284 the fax-analysis-engine computer program 46 looks up, in a conventional OCR confusion matrix, the probability that the letter in the corresponding position in the text produced in processing block 116 by OCR matches the letter selected from the word. That is, the fax-analysis-engine computer program 46 looks up in the conventional OCR confusion matrix the probability that the nth letter occurring in the word matches the nth letter occurring in the text produced by OCR. Then in processing block 286 the fax-analysis-engine computer program 46 repeats the letter selection and probability look-up process performed in processing block 282 and in processing block 284 for all letters either in the name from the namelist of possible addressees, or in the keyword from the keyword list. The probabilities thus obtained from the conventional OCR confusion matrix for all letters in the name or keyword are then multiplied together in processing block 286 to obtain a combined probability that the word, either the name from the namelist of possible addressees or the keyword from the keyword list, matches the text produced by OCR.

After computing probabilities for matching between names of the possible addressee(s) in the namelist and the text for the line block of a possible addressee name obtained by OCR, the fax-analysis-engine computer program 46 in processing block 264 also computes the separation between the best name match and the second best name match. Similarly, after computing probabilities for matching between keywords included in the keyword list and the text obtained by OCR for keyword blocks, the fax-analysis-engine computer program 46 in processing block 264 also computes the separation between the best keyword match and the second best keyword match.

Having determined probabilities for matching between names of the possible addressee(s), and between keywords; and separations between the best name match and the second best name match, and the best keyword match and the second best keyword match, the fax-analysis-engine computer program 46 in processing block 266 uses these probabilities in evaluating the empirically determined maximum likelihood estimate function. If no keywords were found in processing block 242 depicted in FIG. 12, the probability for matching between keywords and the separation between keywords are set to zero in evaluating the empirically determined maximum likelihood estimate function.

Finally, in processing block 268 the fax-analysis-engine computer program 46 determines if the greatest likelihood of a name match evaluated in processing block 226 is less than a user adjustable pre-established minimum threshold. If the greatest likelyhood of a name match is less than the user-adjustable minimum threshold, then an addressee cannot be identified. Similarly, if the separation between the best likelyhood of a name match and the second best likelyhood of a name match is less than a user-adjustable pre-established minimum, then an addressee cannot been identified. Only if:

1. the greatest likelyhood of a name match exceeds the preestablished minimum threshold; and
2. the separation between the best likelyhood of a name match and the second best likelyhood of a name match exceeds the pre-established minimum threshold;

then has the fax-analysis-engine computer program 46 identified the addressee(s), and the fax-router computer program 44 in processing block 128 automatically routes the fax 52.

Fax Server 20 Implementation

Figure 6:
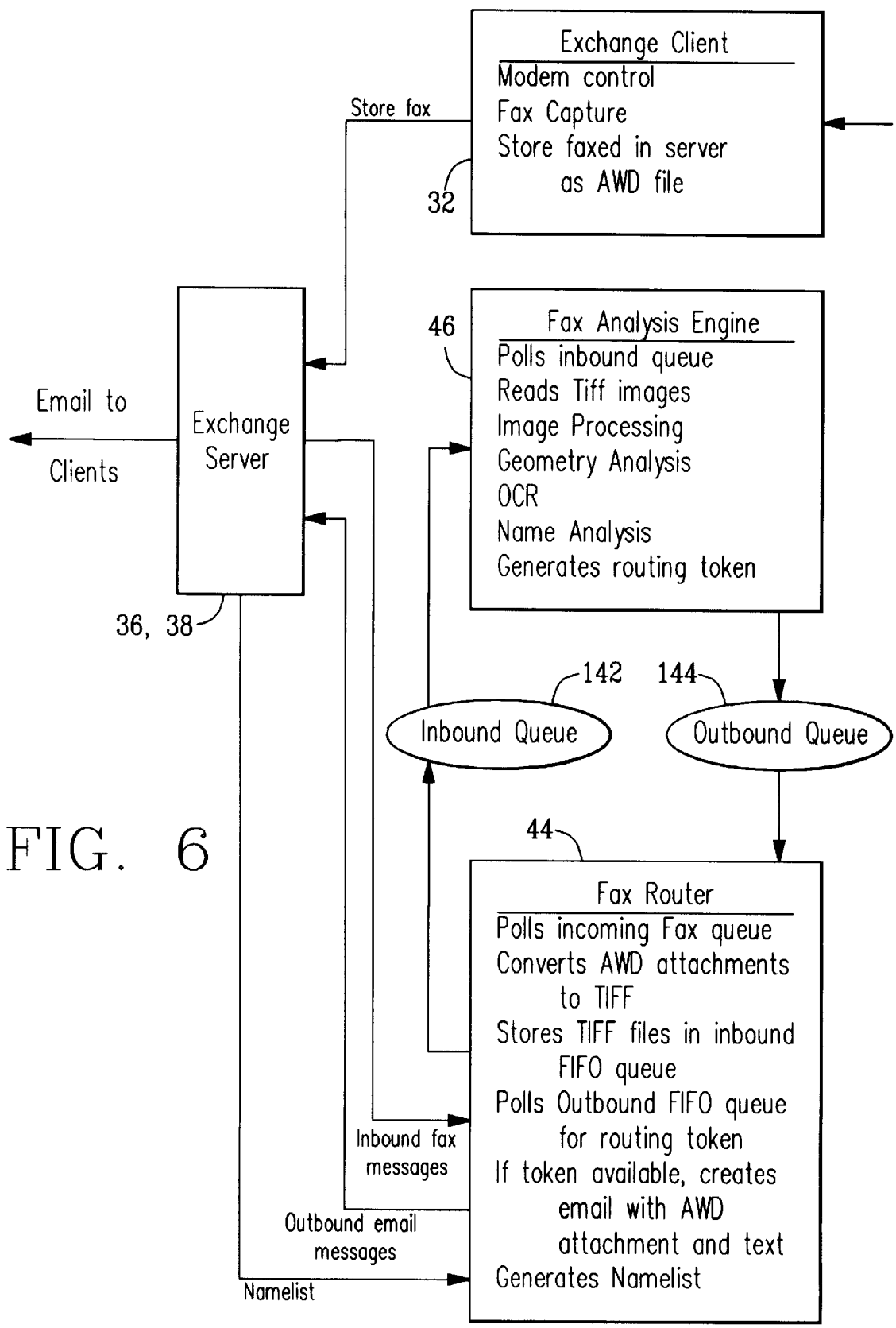
FIG. 6 is a block diagram illustrating in greater detail operations performed in analyzing a fax image, and the relationship between the fax processing and the email system.

A fax server 20 in accordance with the present invention has been implemented as depicted in FIG. 6 to operate in a Microsoft Exchange email environment. Incoming faxes 52 are received by the Microsoft Exchange email Client to provide the fax driver computer program 32. The Exchange Client fax driver computer program 32 transfers the fax in AWD format to the Microsoft Exchange email Server which provides the email interface facility 36 and the fax image retrieval facility 38 for the fax server 20. The Exchange Server fax image retrieval facility 38 both stores the faxes 52 as an .AWD file, and maintains the complete list of all possible addressees which the fax-router computer program 44 periodically retrieves from the email interface facility 36 to generate the name list used by the fax-analysis-engine computer program 46. The fax-router computer program 44 also polls the incoming queue of faxes 52 maintained by the Exchange Server fax image retrieval facility 38 to detect their arrival.

Upon retrieving a recently arrived fax 52 from the Exchange Server email interface facility 36, the fax-router computer program 44 converts the AWD format file to a TIFF format file that the fax-analysis-engine computer program 46 is programmed to process, and stores the TIFF file into an inbound FIFO queue 142. The fax-analysis-engine computer program 46 polls the inbound FIFO queue 142 and retrieves the TIFF image of the fax 52 from the inbound FIFO queue 142. The fax-analysis-engine computer program 46 then performs blocks 102 through 112 depicted in FIG. 5, after which the fax-analysis-engine computer program 46 in processing block 116 performs OCR on all the printed text in the fax 52. After performing OCR, the fax-analysis-engine computer program 46 then in processing block 118 compares the name fields identified in processing block 112 with entries in a list of possible addressees. The fax-analysis-engine computer program 46 then generates a fax routing token for storage into an outbound FIFO queue 144.

In addition to retrieving a recently arrived fax 52 from the Exchange Server email interface facility 36, converting the AWD format file to a TIFF format file, and storing the TIFF file into an inbound FIFO queue 142; the fax-router computer program 44 also polls the outbound FIFO queue 144 for routing tokens generated by the fax-analysis-engine computer program 46. Upon retrieving a routing token from the outbound FIFO queue 144, the fax-router computer program 44 creates email with an .AWD attachment and the text obtained using OCR in processing block 116 for transmission back to the Exchange Server email interface facility 36. Thus, an image of each fax 52, its address and its text are encapsulated into an email message that is stored by the Exchange Server email interface facility 36 into the addressee's mailbox. The particular implementation of the fax server 20 described above requires an NT server to provide the Microsoft Exchange Server email interface facility 36, and a Windows 95 client to provide the fax driver computer program 32, fax-router computer program 44, and fax-analysis-engine computer program 46 for receiving, analyzing, and routing the faxes 52. Testing of this particular implementation of the fax server 20 has permitted email delivery of faxes 52 with 92% or greater precision on a large and variable set of sample faxes 52.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A processor-based fax routing method comprising the steps of:

receiving into a digital computer via electronic fax communication image data representing a document that includes therein a name of an addressee for the fax communication;

locating in the image data of the fax communication a keyword block of text that likely contains a keyword;

locating in the image data of the fax communication an addressee-name block of text, located near the keyword block of text, that likely contains the name of the addressee;

performing optical character recognition ("OCR") on the image data of the fax communication to extract therefrom texts including texts for the keyword, the name of the addressee, and other text present in the image data;

determining probabilities that the text of the name of the addressee extracted by OCR from the image data is that of names in a list of possible addressees;

determining probabilities that the keyword extracted by OCR from the image data is that of keywords in a list of keywords;

using the probabilities that the text of the name of the possible addressee is that of names in a list of possible addressees and the probabilities that the keyword is that of keywords in a list of keywords to evaluate a likelihood that an addressee for the document has been identified;

determining an addressee for the document:
by comparing a best likelihood that an addressee for the document has been identified with a pre-established likelihood threshold; and
by comparing a separation between the best likelihood that an addressee for the document has been identified and a second best likelihood that an addressee for the document has been identified with a pre-established separation threshold;

converting all text extracted by performing OCR on the image data into email addressed to the addressee identified for the fax communication; and storing the email thus obtained onto an email server from which the identified addressee may retrieve the extracted text.

2. The processor-based fax routing method of claim 1 further comprising the step of performing image clean-up on the image data before identifying the keyword.

3. The processor-based fax routing method of claim 1 further comprising the step of identifying any blocks in the image data to be avoided in identifying the keyword.

4. The processor-based fax routing method of claim 3 wherein blocks in the image data to be avoided in identifying the keyword include blocks of text.

5. The processor-based fax routing method of claim 3 wherein blocks in the image data to be avoided in identifying the keyword include blocks that contain a graphic image.

6. The processor-based fax routing method of claim 1 wherein an area in the image data that may contain the keyword is first identified by locating a significant amount of white space immediately left of a possible keyword area.

7. The processor-based fax routing method of claim 6 wherein in identifying the keyword an outline of black space in each possible keyword area is compared with a black space outline for each word in a keyword list.

8. The processor-based fax routing method of claim 6 wherein in identifying the keyword a Fourier transform of black space in each possible keyword area is compared with a Fourier transform for each word in a keyword list.

9. The processor-based fax routing method of claim 1 further comprising the step of storing the image data of the fax communication on the email server from which the identified addressee may retrieve the image data.

* * * * *